United States Patent
Chen et al.

(10) Patent No.: US 7,253,359 B2
(45) Date of Patent: Aug. 7, 2007

(54) COMPUTER ENCLOSURE

(75) Inventors: Yun-Lung Chen, Tu-Cheng (TW); Lin Ding, Shenzhen (CN)

(73) Assignees: Hong Fu Jin Precision Industry (Shenzhen) Co., Ltd., Bao-an District, Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 24 days.

(21) Appl. No.: 11/188,358

(22) Filed: Jul. 25, 2005

(65) Prior Publication Data

US 2006/0061949 A1   Mar. 23, 2006

(30) Foreign Application Priority Data

Sep. 22, 2004   (CN)   ......................... 2004 2 0088765

(51) Int. Cl.
*H05K 5/00* (2006.01)
(52) U.S. Cl. .................. 174/50; 361/683; 361/724; 312/223.2
(58) Field of Classification Search .............. 174/17 R, 174/50, 135, 57, 58; 361/600, 683, 724, 361/726, 730, 753, 759, 725, 727, 740, 752; 24/305, 455, 272.1, 573.11, 578.11; 312/223.1, 312/223.2
See application file for complete search history.

(56) References Cited

U.S. PATENT DOCUMENTS

| | | | |
|---|---|---|---|
| 6,141,222 A * | 10/2000 | Toor et al. .................. | 361/726 |
| 6,373,692 B1 | 4/2002 | Cheng | |
| 6,721,183 B1 * | 4/2004 | Chen et al. .................. | 361/726 |
| 6,775,144 B2 * | 8/2004 | Gan et al. .................... | 361/683 |
| 6,924,975 B2 * | 8/2005 | Lai ............................. | 361/683 |
| 7,061,755 B2 * | 6/2006 | Lin et al. ..................... | 361/683 |

* cited by examiner

*Primary Examiner*—Angel R. Estrada
(74) *Attorney, Agent, or Firm*—Morris Manning & Martin LLP; Tim Tingkang Xia, Esq.

(57) ABSTRACT

A computer enclosure includes a chassis (30), a side panel (10), a clip piece (25) and a button (21). The chassis includes an elastic tab (353) with a free end titled. The side panel is mounted on the chassis. The clip piece is attached to the side panel. The clip piece defines an opening (253) therein. The clip piece engages with the free end of the elastic tab for securing the side panel on the chassis. The button is disposed on the side panel. The button has a post (213) extending through the opening of the side panel for disengaging the elastic tab from the clip piece, thereby moving the side panel away from the chassis.

18 Claims, 5 Drawing Sheets

COMPUTER ENCLOSURE

BACKGROUND OF THE INVENTION

1. Field of the Invention

The present invention relates to a computer enclosure, and more particularly to a computer enclosure with a side panel and a chassis attached together.

2. Background of the Invention

With the popularization of computers, our modern society is closely linked to computers. A computer enclosure generally includes a chassis and a cover assembled thereto. It is required that a computer cover should be demounted and mounted conveniently for checking malfunction of hardware and repairing interior components of a computer. A typical mounting assembly usually utilizes a plurality of screws, directly attaching a computer cover to a computer chassis. Thereby, screwdrivers or other detaching tools are necessary for installation or removal of the computer cover in assembly or disassembly processes, which is laborious and time-consuming.

Generally, the cover is assembled to the chassis by screws which takes time in assembly and disassembly. This also inevitably increases the manufacturing cost. In addition, screws or the equivalents are also parts of inventory that should be carefully monitored in order to prevent a shutdown of the production line.

Therefore, some attempts have been taken to introduce the snapping type enclosure by using less or without screws. For example, a screwless computer case mounting arrangement includes a top-opening case body, a top cover covered on the case body, a hollow shell mounted in an opening on the top cover, an axle pivoted to the hollow shell on the inside, a retaining member fastened to the axle in the hollow shell and hooked on a locating frame of said case body to secure the top cover and the case body together, a handle fastened to the axle and adapted for turning by hand to disengage the retaining member from the locating frame of the case body, a spring mounted on the axle and adapted for forcing the retaining member into engaging with the locating frame of the case body, and a lock installed in the case body and adapted to stop the retaining member from movement relative to the case body. In this mounting arrangement, the retaining member engages or disengages with the locating frame to mount or demount the cover to the case. But the frame and the retaining member are not reliable for repeated use. So the cover can not be secured to the case well again. Therefore, an improved mounting assembly for a cover of a computer enclosure that overcomes the above-mentioned problems is desired.

What is needed, therefore, is a computer enclosure for conveniently and reliably securing a cover to a chassis.

SUMMARY

A computer enclosure includes a chassis, a side panel, a clip piece and a button. The chassis includes an elastic tab with a free end titled outward. The side panel is mounted on the chassis. The clip piece is attached to the side panel. The clip piece defines an opening therein. The clip piece engages with the free end of the elastic tab for securing the side panel on the chassis. The button is disposed on the side panel. The button has a post extending through the opening of the clip piece for disengaging the elastic tab from the clip piece, thereby moving the side panel away from the chassis.

Other objects, advantages and novel features of the invention will become more apparent from the following detailed description when taken in conjunction with the accompanying drawings, in which:

DETAILED DESCRIPTION OF THE INVENTION

Figure 1:
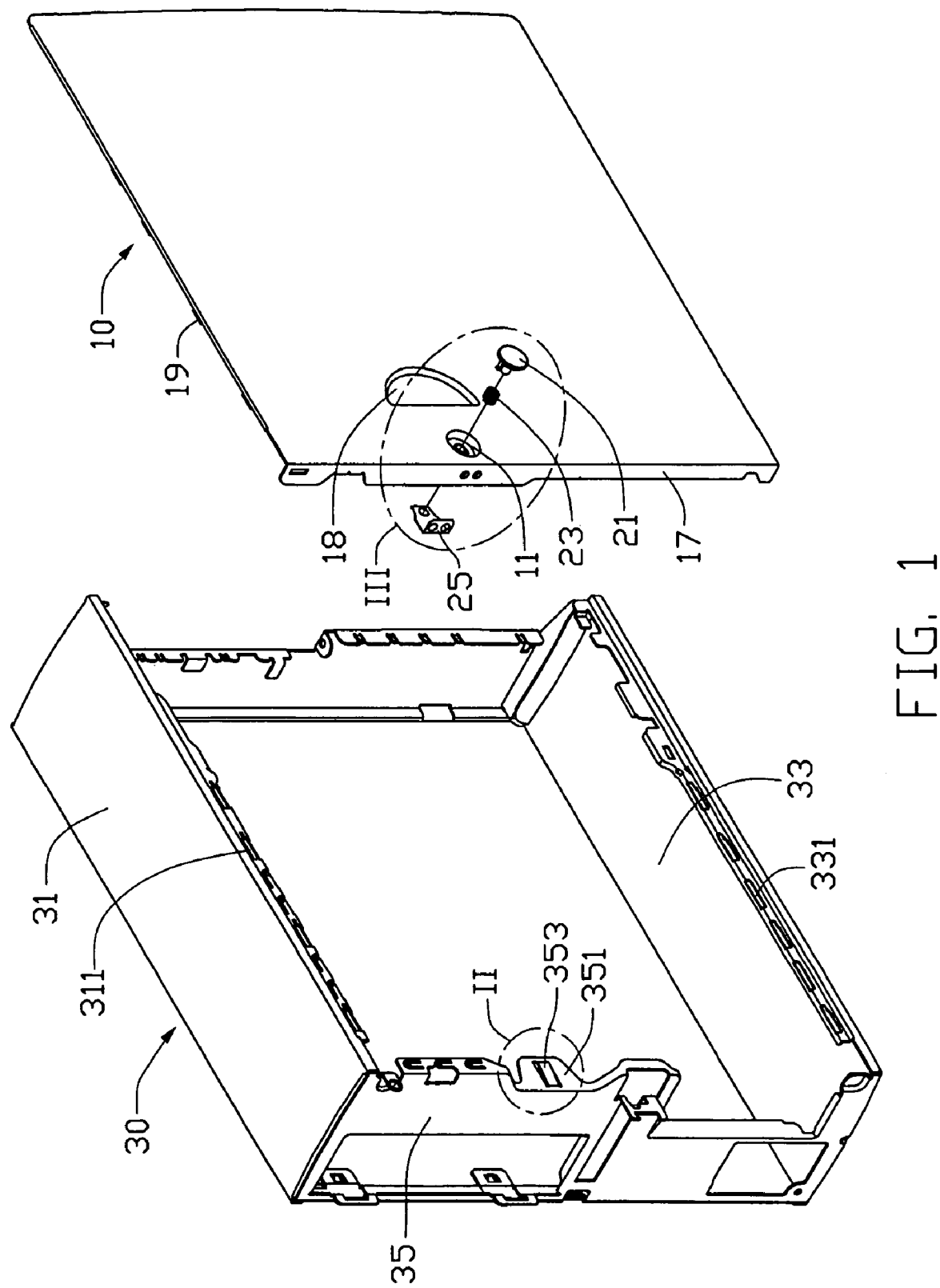
FIG. 1 is an exploded, isometric view of a computer enclosure in accordance with a preferred embodiment of the present invention including a chassis, a side panel, a clip piece and a button.
Figure 2:
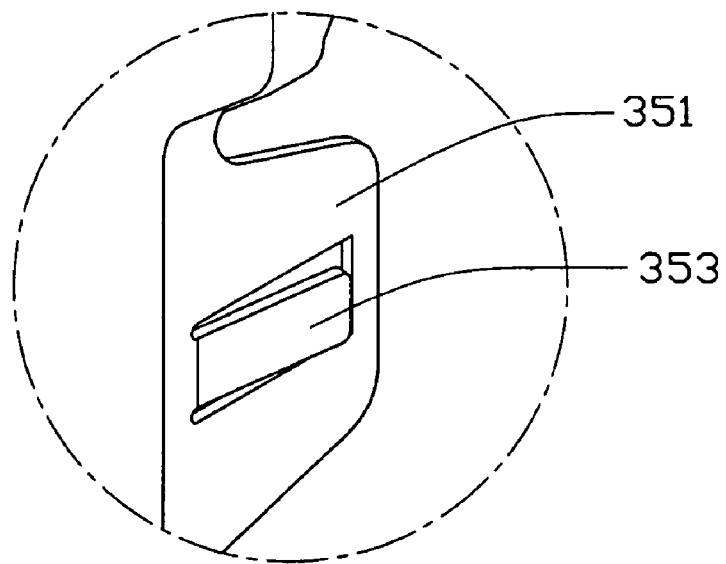
FIG. 2 is an enlarged, isometric view of encircled portion II in FIG. 1.
Figure 3:
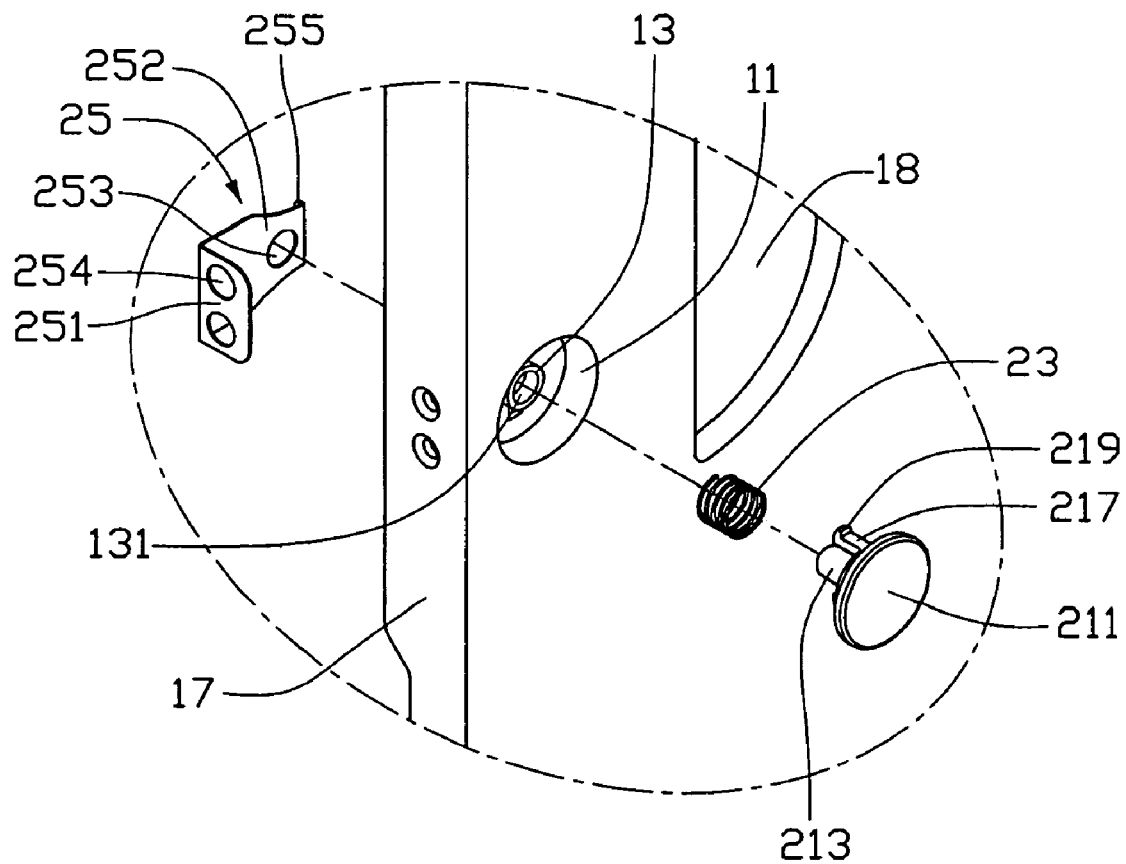
FIG. 3 is an enlarged, isometric view of encircled portion III in FIG. 1.
Figure 4:
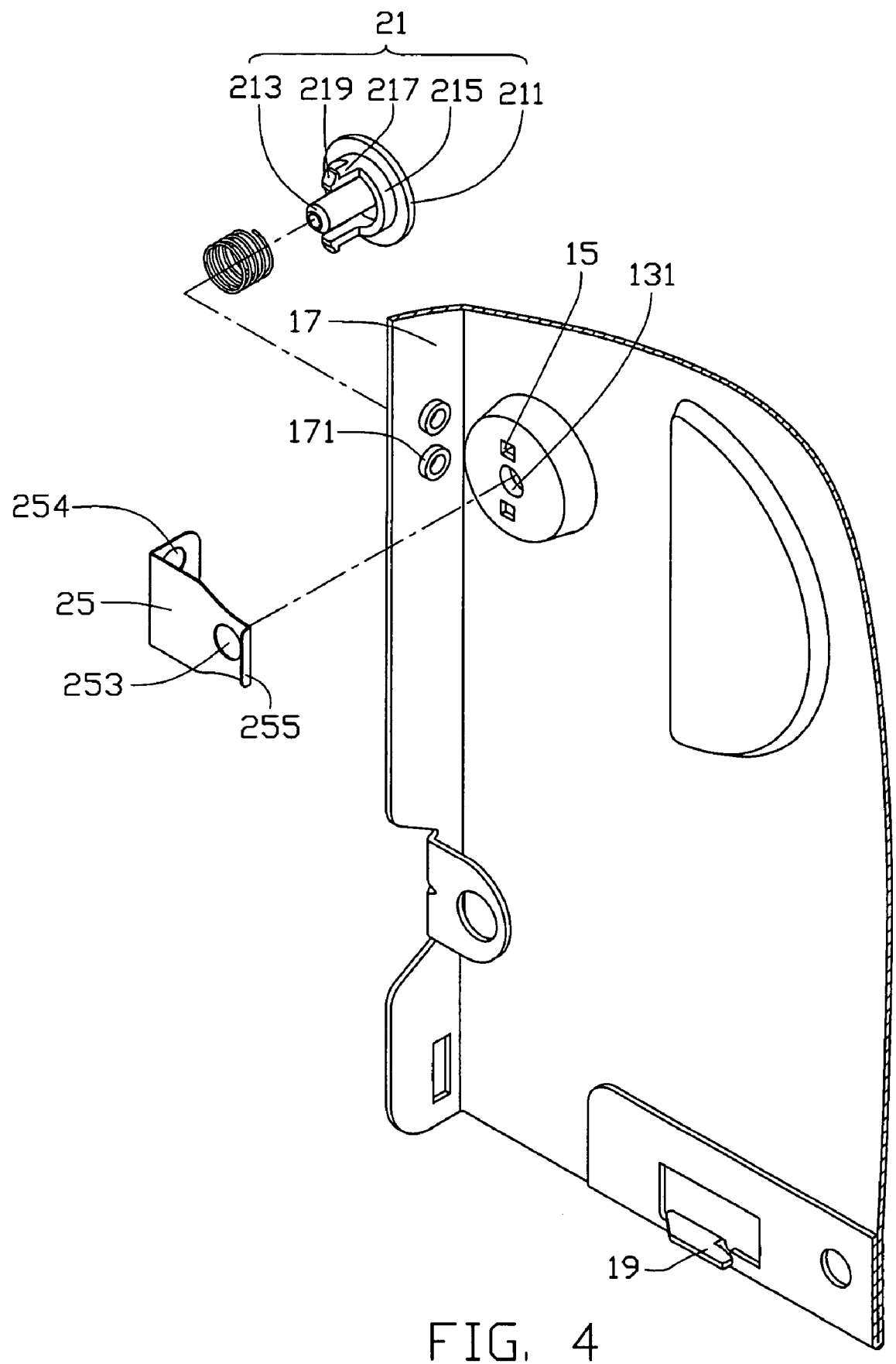
FIG. 4 is a partial view of FIG. 1, showing the side panel, the clip piece and the button.

Referring to FIGS. 1 to 4, an enclosure of an electronic device like a computer in accordance with a preferred embodiment of the present invention includes a chassis 30 and a side panel 10 which is secured to the chassis 30.

The side panel 10 is bent inwardly and perpendicularly to form a flange 17. A pair of rivets 171 is formed on the inner side of the flange 17. The side panel 10 is stamped to define a recess 11 adjacent to the rivets 171. A loop 13 is formed in the recess 11 and the loop 13 has a center hole 131. A resilient member, such as a spring 23, is placed around the loop 13. A pair of apertures 15 is defined at two sides of the center hole 131. The side panel 10 includes an operation portion 18 for pulling the side panel 10. A plurality of protruding clasps 19 is formed from top and bottom edges of the side panel 10.

A button 21 is secured in the recess 11. The button 21 includes a press portion 211, a post 213 and a circular extension 215 formed around the post 213. A pair of engaging members 217 extends from the extension 215 corresponding to the pair of apertures 15 of the side panel 10. A barb 219 is formed at a free end of the engaging member 217. A distance between the pair of barbs 219 is slightly greater than a distance between the pair of apertures 15.

A clip piece 25 is generally L-shaped, which includes a fastener portion 251 and an elastic clip portion 252. A pair of holes 254 corresponding to the pair of rivets 171 is defined in the fastener portion 251. The clip portion 252 defines an opening 253 thereon. A free end of the clip portion 252 is bent outward to form a hook 255.

The chassis 30 includes a top panel 31, a rear panel 35 and a bottom panel 33. The corresponding edges of the top panel 31 and the bottom panel 33 define a plurality of slots 311, 331 for the plurality of clasps 19 engaging therein. The rear panel 35 includes a flange 351 that is folded over and is transverse to the rear panel 35. An elastic tab 353 is stamped therefrom, whose free end is tilted outward.

Figure 5:
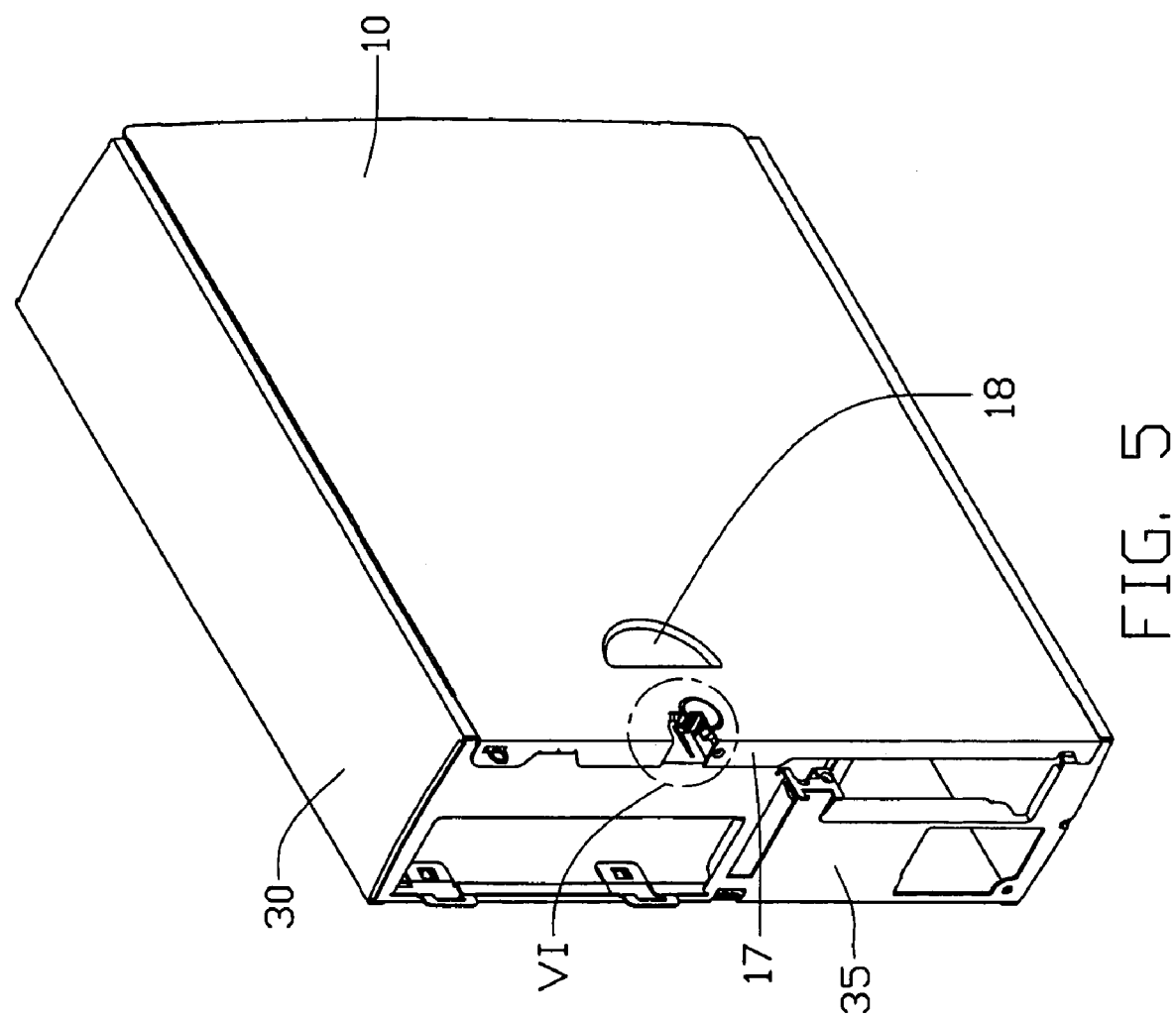
FIG. 5 is an assembled, isometric view of FIG. 1.
Figure 6:
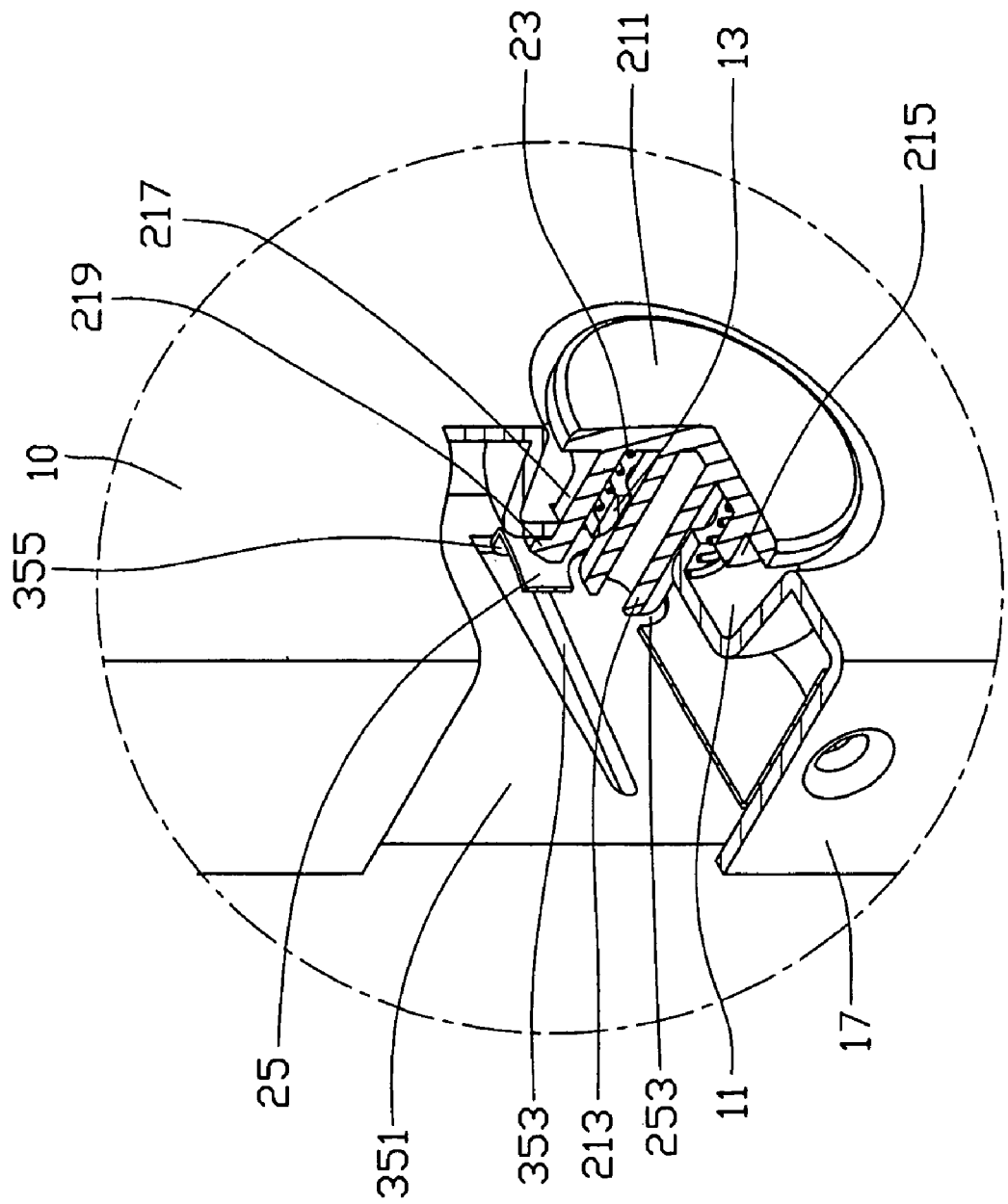
FIG. 6 is an enlarged, isometric view of encircled portion VI in FIG. 5.

Referring to FIGS. 5 and 6, in assembly, the rivets 171 extend into the hole 254 to secure the clip piece 25 on the flange 17. The opening 253 of the clip piece 25 is in alignment with the centre hole 131 of the side panel 10.

The spring 23 is placed around the loop 13. The button 211 is located in the recess 11, and the post 213 inserts through the spring 23, the center hole 131 and the opening 253. The spring 23 is compressed in the recess 11. At the same time, the engaging members 217 are deformed to extend through the apertures 15 to movably secure the button 21 in the recess 11.

The clasps 19 of the side panel 10 are putted into the slots 311, 331 of the chassis 30. The side panel 10 is slid forward. During the movement, the clip piece 25 slides over the elastic tab 353. The elastic tab 353 rebounds and abuts against the hook 255 of the clip piece 25. Thereby, the side panel 10 can not be slid backwardly.

In disassembly, the button 21 is pressed. The post 213 extends through the opening 253 and deforms the elastic tab 353 inward, thereby the clip piece 25 avoiding the elastic tab 353. So the side panel 10 can be removed from the chassis 30.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A computer enclosure comprising:
   a chassis comprising a rear panel with a flange folded therefrom, the flange having an elastic tab with a free end tilted outward;
   a side panel mounted on the chassis;
   a clip piece attachable to the side panel, the clip piece defining an opening therein, the clip piece engagable with the free end of the elastic tab for securing the side panel onto the chassis; and
   a button disposed on the side panel, the button having a post extending through the opening of the clip piece to move the free end of the elastic tab inward for disengaging the free end of the elastic tab from the clip piece, thereby moving the side panel away from the chassis.

2. The computer enclosure as described in claim 1, wherein a recess is defined in the side panel for receiving the button therein, the post of the button extending through the recess.

3. The computer enclosure as described in claim 2, wherein a spring is located in the recess and compressed in the recess.

4. The computer enclosure as described in claim 1, wherein a plurality of apertures is defined in the side panel, and the button has a plurality of engaging members extending through the plurality of apertures for movably securing the button to the side panel.

5. The computer enclosure as described in claim 4, wherein a barb is formed at an end of the engaging member.

6. The computer enclosure as described in claim 1, wherein an end of the clip piece is bent to form a hook.

7. The computer enclosure as described in claim 1, wherein the side panel comprises a plurality of clasps and the chassis comprises a plurality of slots for the plurality of clasps engaging therein.

8. A computer enclosure comprising:
   a chassis comprising an elastic tab;
   a side panel mounted on the chassis;
   a clip piece attached to the side panel, the clip piece engaging with the elastic tab for securing the side panel on the chassis;
   a button disposed on the outside of the side panel, the button comprising a post penetrating the side panel, the post having a free end for resisting against the elastic tab so as to move the elastic tab away from the clip piece, thereby moving the side panel away from the chassis; and
   a spring disposed under the button.

9. The computer enclosure as described in claim 8, wherein a free end of the elastic tab is tilted outward.

10. The computer enclosure as described in claim 8, wherein the clip piece defines an opening for the post extending through.

11. The computer enclosure as described in claim 8, wherein a free end of the clip piece is bent to form a hook.

12. The computer enclosure as described in claim 8, wherein a recess is defined in the side panel for receiving the button therein.

13. The computer enclosure as described in claim 12, wherein the spring is located in the recess and compressed in the recess.

14. The computer enclosure as described in claim 8, wherein a plurality of apertures is defined in the side panel, and the button has a plurality of engaging members to extend through the plurality of apertures for movably securing the button to the side panel.

15. The computer enclosure as described in claim 14, wherein a barb is formed at an end of the engaging member.

16. The computer enclosure as described in claim 8, wherein the side panel comprises a plurality of clasps and the chassis comprises a plurality of slots for the plurality of clasps engaging therein.

17. An electronic device comprising:
    a chassis partially enclosing said electronic device, said chassis defining an elastic tab thereon and said elastic tab movable flexibly relative to said chassis when a force applies thereon;
    a side panel attachably installable to said chassis so as to entirely enclose said electronic device together with said chassis;
    a clip piece attachably extending from said side panel, and reachable to said elastic tab when said side panel is installed to said chassis, said clip piece engagable with said elastic tab to secure said side panel to said chassis when said chip piece reaches said elastic tab; and
    a button attachably installable to said side panel, and movable straightly along a direction toward said clip piece and said elastic tab when said chip piece engages with said elastic tab, movement of said button able to physically engage with said elastic tab and move said elastic tab away from said clip piece so as to release said side panel from said chassis.

18. The electronic device as described in claim 17, wherein said button moves straightly through an opening of said clip piece in order to physically engage with said elastic tab.

* * * * *